US008216068B2

(12) United States Patent
Kishi

(10) Patent No.: US 8,216,068 B2

(45) Date of Patent: Jul. 10, 2012

(54) GAMING MACHINE

(75) Inventor: Hideaki Kishi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1115 days.

(21) Appl. No.: 12/018,423

(22) Filed: Jan. 23, 2008

(65) Prior Publication Data

US 2008/0176653 A1 Jul. 24, 2008

(30) Foreign Application Priority Data

Jan. 24, 2007 (JP) ................................ 2007-013779

(51) Int. Cl.
*A63F 13/00* (2006.01)

(52) U.S. Cl. ........................................... 463/31; 463/20

(58) Field of Classification Search .................... 463/20, 463/31

See application file for complete search history.

(56) References Cited

U.S. PATENT DOCUMENTS

| | | | | |
|---|---|---|---|---|
| 4,306,768 | A | 12/1981 | Egging | 350/174 |
| 4,454,670 | A | 6/1984 | Bachmann et al. | 194/350 |
| 4,517,558 | A | 5/1985 | Davids | 340/700 |
| 4,562,433 | A | 12/1985 | Biferno | 340/716 |
| 4,568,928 | A | 2/1986 | Biferno | 340/716 |
| 4,718,672 | A | 1/1988 | Okada | 273/143 R |
| 5,283,560 | A | 2/1994 | Bartlett | 345/113 |
| 5,351,966 | A | 10/1994 | Tohyama et al. | 273/311 |
| 5,393,061 | A | 2/1995 | Manship et al. | 273/143 R |
| 5,468,064 | A * | 11/1995 | Lengyel et al. | 349/96 |
| 5,580,055 | A | 12/1996 | Hagiwara | 273/143 R |
| 5,697,843 | A | 12/1997 | Manship et al. | 463/20 |
| 5,722,891 | A | 3/1998 | Inoue | 463/20 |
| 5,725,210 | A | 3/1998 | Yamaguchi et al. | 273/121 |
| 5,752,881 | A | 5/1998 | Inoue | 273/143 R |
| 5,810,665 | A | 9/1998 | Takemoto et al. | 463/31 |
| 5,890,962 | A | 4/1999 | Takemoto | 463/20 |
| 5,980,384 | A | 11/1999 | Barrie | 463/16 |
| 6,027,115 | A | 2/2000 | Griswold et al. | 273/143 R |
| 6,036,188 | A | 3/2000 | Gomez et al. | 273/118 R |
| 6,038,188 | A | 3/2000 | Akamatsu | 365/226 |
| 6,056,642 | A | 5/2000 | Bennett | 463/20 |
| 6,086,066 | A | 7/2000 | Takeuchi et al. | 273/143 R |
| 6,089,977 | A | 7/2000 | Bennett | 463/20 |
| 6,095,921 | A | 8/2000 | Walker et al. | 463/20 |
| 6,135,884 | A | 10/2000 | Hedrick et al. | 463/20 |

(Continued)

FOREIGN PATENT DOCUMENTS

EP 0 060 019 A1 9/1982

(Continued)

OTHER PUBLICATIONS

U.S. Appl. No. 12/018,475, filed Jan. 23, 2008, Kishi.

(Continued)

*Primary Examiner* — Dmitry Suhol
*Assistant Examiner* — Malina K Rustemeyer
(74) *Attorney, Agent, or Firm* — Nixon Peabody LLP

(57) ABSTRACT

A gaming machine according to one embodiment of the invention has a rotating reel display device that variably displays a plurality of kinds of identification information required for a game, and a transmissive liquid crystal display device 30 that enables symbol information of the rotating reel display device to be visually recognized and that is subjected to non-glare treatment on its surface. Then, a covering member 50 to enhance transmittance is attached to the surface portion of the transmissive liquid crystal display device 30.

25 Claims, 9 Drawing Sheets

U.S. PATENT DOCUMENTS

| | | | | |
|---|---|---|---|---|
| 6,135,885 | A | 10/2000 | Lermusiaux | 463/20 |
| 6,164,645 | A | 12/2000 | Weiss | 273/138.2 |
| 6,181,301 | B1 | 1/2001 | Inoguchi et al. | 345/5 |
| 6,190,255 | B1 | 2/2001 | Thomas et al. | 463/20 |
| 6,193,606 | B1 | 2/2001 | Walker et al. | 463/20 |
| 6,224,482 | B1 | 5/2001 | Bennett | 463/20 |
| 6,251,013 | B1 | 6/2001 | Bennett | 463/13 |
| 6,261,177 | B1 | 7/2001 | Bennett | 463/16 |
| 6,270,411 | B1 | 8/2001 | Gura et al. | 463/20 |
| 6,280,328 | B1 | 8/2001 | Holch et al. | |
| 6,290,600 | B1 | 9/2001 | Glasson | 463/20 |
| 6,317,128 | B1 | 11/2001 | Harrison et al. | 345/629 |
| 6,364,766 | B1 | 4/2002 | Anderson et al. | 463/16 |
| 6,368,216 | B1 | 4/2002 | Hedrick et al. | 463/20 |
| 6,375,568 | B1 | 4/2002 | Roffman et al. | 463/26 |
| 6,419,579 | B1 | 7/2002 | Bennett | 463/20 |
| 6,517,432 | B1 | 2/2003 | Jaffe | 463/16 |
| 6,517,433 | B2 | 2/2003 | Loose et al. | 463/20 |
| 6,817,946 | B2 | 11/2004 | Motegi et al. | 463/31 |
| 6,923,721 | B2 | 8/2005 | Luciano et al. | 463/24 |
| 6,937,298 | B2 | 8/2005 | Okada | 349/58 |
| 7,001,060 | B1 * | 2/2006 | Kimura | 362/620 |
| 7,097,560 | B2 | 8/2006 | Okada | 463/20 |
| 7,140,963 | B2 | 11/2006 | Kojima | 463/20 |
| 7,159,865 | B2 | 1/2007 | Okada | 273/143 |
| 7,160,187 | B2 | 1/2007 | Loose et al. | 463/20 |
| 7,166,029 | B2 | 1/2007 | Enzminger | 463/20 |
| 7,204,753 | B2 | 4/2007 | Ozaki et al. | 463/16 |
| 7,255,643 | B2 | 8/2007 | Ozaki et al. | 463/20 |
| 7,410,419 | B2 | 8/2008 | Fiden | |
| 7,458,890 | B2 | 12/2008 | Loose et al. | 463/16 |
| 7,510,475 | B2 | 3/2009 | Loose et al. | 463/31 |
| 7,510,476 | B2 * | 3/2009 | Kobayashi | 463/31 |
| 7,585,220 | B2 | 9/2009 | Loose et al. | 463/20 |
| 7,594,852 | B2 | 9/2009 | Rasmussen | |
| 7,730,413 | B1 | 6/2010 | Engel et al. | 715/764 |
| 7,800,721 | B2 * | 9/2010 | Shutou et al. | 349/118 |
| 2001/0000636 | A1 | 5/2001 | Weiss | 273/138.2 |
| 2001/0031658 | A1 | 10/2001 | Ozaki et al. | 463/16 |
| 2002/0175466 | A1 | 11/2002 | Loose et al. | 273/143 |
| 2003/0045354 | A1 | 3/2003 | Giobbi | |
| 2003/0060269 | A1 | 3/2003 | Paulsen et al. | 463/20 |
| 2003/0087690 | A1 | 5/2003 | Loose et al. | 463/20 |
| 2003/0157980 | A1 | 8/2003 | Loose et al. | 463/20 |
| 2003/0234489 | A1 | 12/2003 | Okada | 273/236 |
| 2003/0236118 | A1 | 12/2003 | Okada | 463/20 |
| 2004/0014520 | A1 | 1/2004 | Okada | 463/20 |
| 2004/0029636 | A1 | 2/2004 | Wells | 463/32 |
| 2004/0063490 | A1 | 4/2004 | Okada | 463/20 |
| 2004/0116178 | A1 | 6/2004 | Okada | 463/20 |
| 2004/0147303 | A1 | 7/2004 | Imura et al. | 463/16 |
| 2004/0150162 | A1 | 8/2004 | Okada | 273/292 |
| 2004/0152502 | A1 | 8/2004 | Okada | 463/16 |
| 2004/0166925 | A1 | 8/2004 | Emori et al. | 463/20 |
| 2004/0166926 | A1 | 8/2004 | Adachi et al. | 463/20 |
| 2004/0171418 | A1 | 9/2004 | Okada | 463/20 |
| 2004/0198485 | A1 | 10/2004 | Loose et al. | 463/20 |
| 2004/0207154 | A1 | 10/2004 | Okada | 273/138.1 |
| 2004/0209666 | A1 | 10/2004 | Tashiro et al. | 463/20 |
| 2004/0209667 | A1 | 10/2004 | Emori et al. | 463/20 |
| 2004/0209668 | A1 | 10/2004 | Okada | 463/20 |
| 2004/0209670 | A1 | 10/2004 | Adachi et al. | 463/20 |
| 2004/0209671 | A1 | 10/2004 | Okada | 463/20 |
| 2004/0209672 | A1 | 10/2004 | Okada | 463/20 |
| 2004/0209678 | A1 | 10/2004 | Okada | 463/30 |
| 2004/0209681 | A1 | 10/2004 | Emori et al. | 463/31 |
| 2004/0209682 | A1 | 10/2004 | Okada | 463/31 |
| 2004/0214635 | A1 | 10/2004 | Okada | 463/30 |
| 2004/0214637 | A1 | 10/2004 | Nonaka | 463/31 |
| 2004/0219965 | A1 | 11/2004 | Okada | 463/16 |
| 2004/0224747 | A1 | 11/2004 | Okada | 463/16 |
| 2004/0224758 | A1 | 11/2004 | Okada et al. | 463/31 |
| 2004/0227286 | A1 | 11/2004 | Tanimura et al. | 273/143 |
| 2004/0227866 | A1 | 11/2004 | Okada | 349/58 |
| 2004/0229680 | A1 | 11/2004 | Hoshino et al. | 463/20 |
| 2004/0229686 | A1 | 11/2004 | Tanimura et al. | 463/30 |
| 2004/0266510 | A1 | 12/2004 | Kojima | 463/16 |
| 2004/0266515 | A1 | 12/2004 | Gauselmann | 463/20 |
| 2004/0266521 | A1 | 12/2004 | Kojima | 463/20 |
| 2005/0032571 | A1 | 2/2005 | Asonuma | 463/20 |
| 2005/0140088 | A1 | 6/2005 | Randall | 273/143 |
| 2005/0153775 | A1 | 7/2005 | Griswold et al. | 463/30 |
| 2005/0187003 | A1 | 8/2005 | Adachi et al. | 463/16 |
| 2005/0192090 | A1 | 9/2005 | Muir et al. | 463/30 |
| 2005/0255908 | A1 | 11/2005 | Wells | 463/20 |
| 2005/0272500 | A1 | 12/2005 | Tanimura et al. | 463/20 |
| 2005/0282616 | A1 | 12/2005 | Tanimura et al. | 463/20 |
| 2005/0282617 | A1 | 12/2005 | Sekiguchi et al. | 463/20 |
| 2006/0014580 | A1 | 1/2006 | Hawthorn | 463/20 |
| 2006/0128467 | A1 | 6/2006 | Thomas | 463/31 |
| 2006/0135248 | A1 | 6/2006 | Anderson et al. | 463/22 |
| 2006/0252496 | A1 | 11/2006 | Rasmussen | 463/20 |
| 2006/0281530 | A1 | 12/2006 | Seelig et al. | 463/20 |
| 2007/0004513 | A1 | 1/2007 | Wells et al. | 463/31 |
| 2007/0054730 | A1 | 3/2007 | Mattice et al. | 463/16 |
| 2007/0149281 | A1 | 6/2007 | Gadda et al. | 463/34 |
| 2008/0004104 | A1 | 1/2008 | Durham et al. | |
| 2008/0096655 | A1 | 4/2008 | Rasmussen et al. | |
| 2008/0113755 | A1 | 5/2008 | Rasmussen et al. | |
| 2008/0119288 | A1 | 5/2008 | Rasmussen | |
| 2008/0207303 | A1 | 8/2008 | Rasmussen | |
| 2009/0075721 | A1 | 3/2009 | Pacey et al. | |
| 2009/0131148 | A1 | 5/2009 | Loose et al. | 463/20 |
| 2009/0181758 | A1 | 7/2009 | Loose et al. | 463/20 |

FOREIGN PATENT DOCUMENTS

| | | | |
|---|---|---|---|
| EP | 0 789 338 | A1 | 8/1997 |
| GB | 2 124 505 | A | 2/1984 |
| GB | 2 165 074 | A | 4/1986 |
| GB | 2 253 299 | A | 9/1992 |
| GB | 2 349 494 | A | 11/2000 |
| JP | 60 061079 | | 4/1985 |
| JP | 61 279272 | | 12/1986 |
| JP | 02 019182 | | 1/1990 |
| JP | 04 109977 | | 4/1992 |
| JP | 04 114676 | | 4/1992 |
| JP | 04 341288 | | 11/1992 |
| JP | 05 177043 | | 7/1993 |
| JP | 06 039085 | | 2/1994 |
| JP | 07 016340 | | 1/1995 |
| JP | 07 124290 | | 5/1995 |
| JP | 07 299189 | | 11/1995 |
| JP | 08 103541 | | 4/1996 |
| JP | 2531253 | | 1/1997 |
| JP | 09 207625 | | 8/1997 |
| JP | 10 071228 | | 3/1998 |
| JP | 10 091076 | | 4/1998 |
| JP | 10 305130 | | 11/1998 |
| JP | 10 328398 | | 11/1998 |
| JP | 11 090017 | | 4/1999 |
| JP | 11 099240 | | 4/1999 |
| JP | 11 137774 | | 5/1999 |
| JP | 11 152970 | | 6/1999 |
| JP | 11-153970 | | 6/1999 |
| JP | 11-244451 | | 9/1999 |
| JP | 2000-51314 | | 2/2000 |
| JP | 2000-65097 | | 3/2000 |
| JP | 2000-68925 | | 3/2000 |
| JP | 2000-262738 | | 9/2000 |
| JP | 2000-350805 | | 12/2000 |
| JP | 2001-062032 | | 3/2001 |
| JP | 2002-113150 | | 4/2002 |
| JP | 2005-342344 | | 12/2005 |
| WO | WO 99/53454 | A1 | 10/1999 |
| WO | WO 99/64997 | A1 | 12/1999 |
| WO | WO 00/32286 | A1 | 6/2000 |
| WO | WO 2006/124976 | A1 | 1/2006 |
| WO | WO 2006/036948 | A2 | 4/2006 |
| WO | WO 2007/011717 | A2 | 1/2007 |
| WO | WO 2007/089410 | A2 | 8/2007 |
| WO | WO 2008/011049 | A2 | 1/2008 |

OTHER PUBLICATIONS

"Bigfoot" Product Sheet, Shuffle Master, Inc., 1 page (2000).
"Big Games Safari" Product Sheet, IGT, 24 pages (2000).
"Cabby Cash™" Product Sheet, Anchor Gaming, 2 pages (2000).

"Congo Quest™" Product Sheet, Anchor Gaming, 2 pages (2000).
"Fishin' Buddies™" Product Sheet, Anchor Gaming, 2 pages (2000).
Legato, Frank, "The Full Monty," Strictly Slots, pp. 48-50 (Jun. 1999).
"Goooaal!" Product Sheet, Bally Gaming, Inc., 2 pages (2000).
"Great Whites" Product Sheet, VLC, Inc., 2 pages (2000).
"Jackpot Stampede Deluxe™" Product Sheet, WMS Gaming Inc., 2 pages (1997).
"Loaded Dice" Product Sheet, Konami Gaming, 2 pages (2000).
"Neptune's Pearls" Product Sheet, Unidesa Gaming, 4 pages (1998).
"Penguin Pays" Product Sheet, Aristocrat Incorporated, 2 pages (1998).
"Stroke Of Luck™" Product Sheet, WMS Gaming Inc., 2 pages (1997).
"Wild Cougar" Article, Strictly Slots, p. 44 (Feb. 1999).
"Yahtzee® Brand Video Game" Product Brochure, Hasbro, Inc., 2 pages (2000).
Decision of Refusal of Aug. 30, 2005, issued from Japanese Patent Office for the corresponding Japanese application No. 2000-051314.
Defendant Bally Gaming Inc.'s Answer, Affirmative Defenses, and Counterclaims to Complaint for Patent Infringement; dated Nov. 9, 2010; Civil Action No. 1:10-CV06679; pp. 1-29.
Complaint for Patent Infringement; dated Oct. 16, 2010; pp. 1-64.
Stone, Maureen, et al. "Alpha, Contrast and the Perception of Visual Metadata." *Simon Fraser University*: 5 pages.
"Learn About LCD TV and TFT LCD Displays." AVDEALS.com. Sep. 14, 2009: 6 pages. http://www.avdeals.com/classroom/what_is_tft_lcd.htm.
"Liquid Crystal Display." Wikipedia.org. Sep. 14, 2009: 11 pages. http://en.wikipedia.org/wiki/Liquid_crystal_display.

* cited by examiner

GAMING MACHINE

The present disclosure relates to subject matter contained in Japanese Patent Application No. 2007-013779 filed on Jan. 24, 2007, which is expressly incorporated herein by reference in its entireties.

BACKGROUND OF THE INVENTION

The present invention relates to a gaming machine such as, for example, a slot machine, pinball machine and the like provided with an image display device capable of displaying various kinds of game information.

Conventionally, as the above-mentioned gaming machine, machines have been known into which are incorporated an image display device to be visually recognized to enhance the effect of representation. In the image display device, during a period of time the game is carried out, in order to raise expectations and excitement of players, various characters are displayed to perform a variety of representation (representation image display).

The above-mentioned image display device is installed in some portion of a housing of the gaming machine, and for example, as disclosed in Japanese Laid-Open Patent Publication No. 2005-342344, a gaming machine (slot machine) is known where an image display device is configured to be a transmissive type, and the machine is configured to enable identification information of a variable display device (rotating reel display device), which is installed on the back of the image display device and variably displays a plurality of kinds of identification information, to be superimposed on an image of the image display device to be visually recognized. This slot machine is configured to perform variable display and stop display of a plurality of kinds of identification information (symbols) on conditions that a predetermined amount of BET and operation of a start lever is performed, and to add a predetermined amount of game value based on a combination of symbols stopped and displayed.

Usually, the above-mentioned transmissive image display device is subjected to non-glare treatment (also referred to as anti-glare treatment) on its surface to prevent glare from the environment. Herein, "non-glare treatment" is treatment for roughening the surface of a surface member of the image display device, for example, by forming minute asperities on the surface, and the like. In other words, by roughening the surface of the image display device, the light incident from the environment is reflected diffusely, the reflectance is decreased, and it is possible to reduce glare from the environment.

Meanwhile, when a player plays a game in a gaming machine, it is general that the player is seated at the front of the housing and sees, from the front, images of the transmissive image display device and the identification information of the variable display device installed on the back of the image display device. Therefore, even when the above-mentioned non-glare treatment is not performed, the player is not concerned about glare from the environment so much. Conversely, by the non-glare treatment being performed, there is a problem that the identification information of the variable display device is hard to visually recognize. In other words, the identification information of the variable display device passes through a display panel or the like of the transmissive image display device and reaches the player, the transmission light (identification information) from the inside is scattered (diffusely reflected) at portions subjected to the non-glare treatment, and there is a problem that the player feels the identification information dark.

Accordingly, a gaming machine is required that is a gaming machine provided with a transmissive image display device subjected to non-glare treatment and that makes it easier to visually recognize the identification information which is passed through the image display device and transmitted from the inside.

BRIEF SUMMARY OF THE INVENTION

In an aspect of the present invention, there is provided a gaming machine comprising a variable display device that variably displays a plurality of kinds of identification information required for a game and a transmissive image display device that enables the identification information of the variable display device to be visually recognized and that is subjected to non-glare treatment on its surface, wherein a covering member to enhance transmittance is attached to a surface portion of the transmissive image display device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of a gaming machine according to the invention will specifically be described below with a slot machine exemplified.

Figure 1:
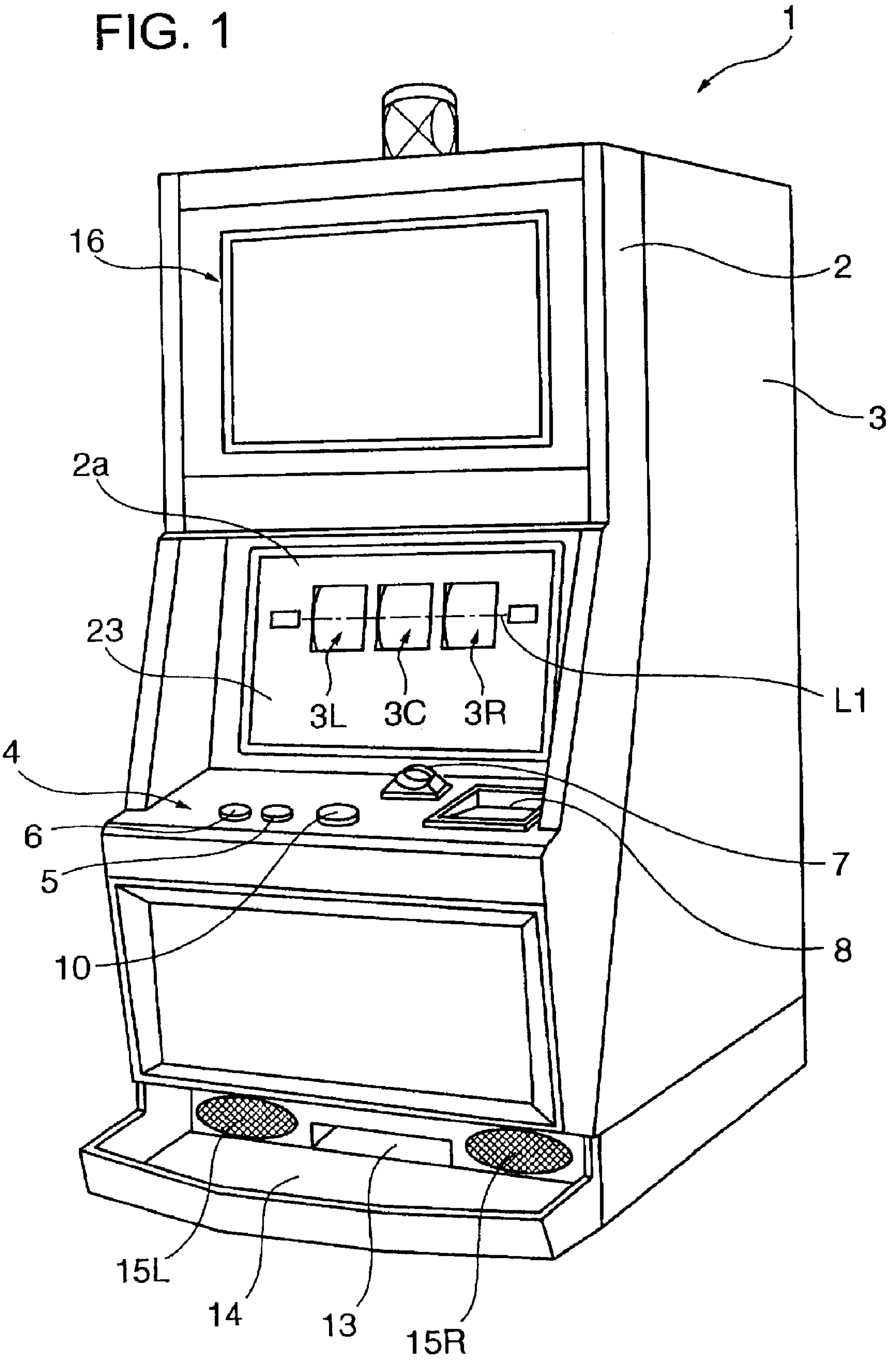
FIG. 1 is a perspective view showing a slot machine that is an example of a gaming machine according to the invention.
Figure 2:
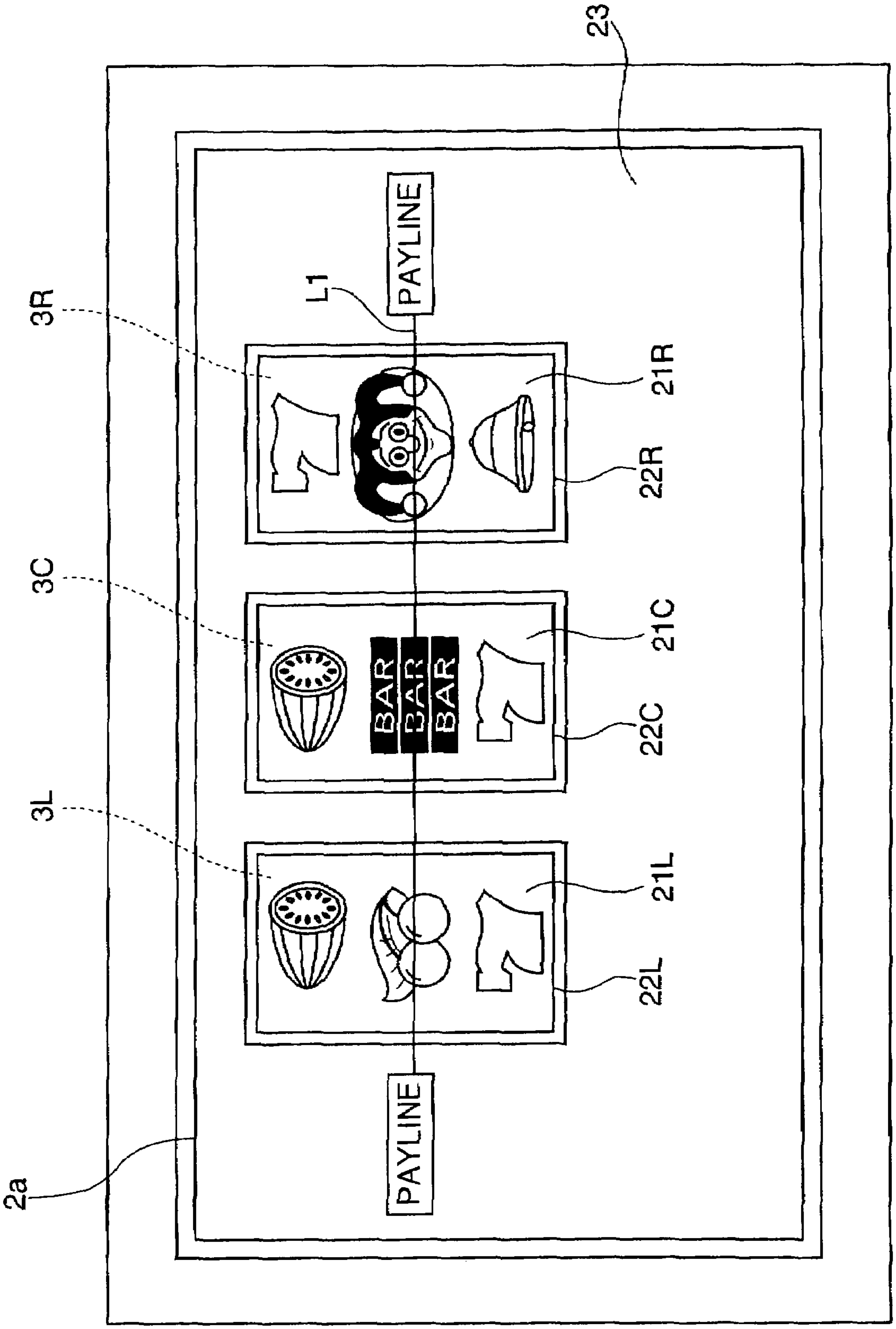
FIG. 2 is a view showing an enlarged game area of the slot machine.
Figure 3:
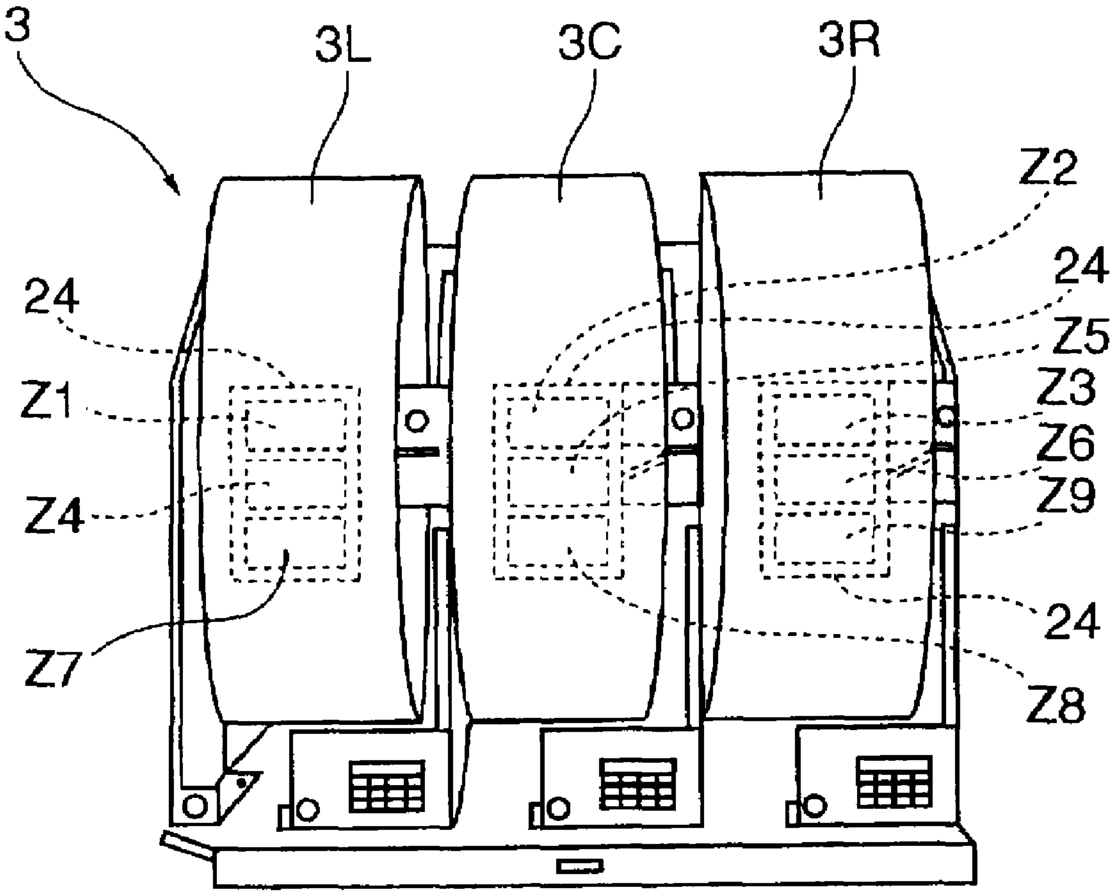
FIG. 3 is a view showing a rotating reel display device showing an example of a variable display device.
Figure 4:
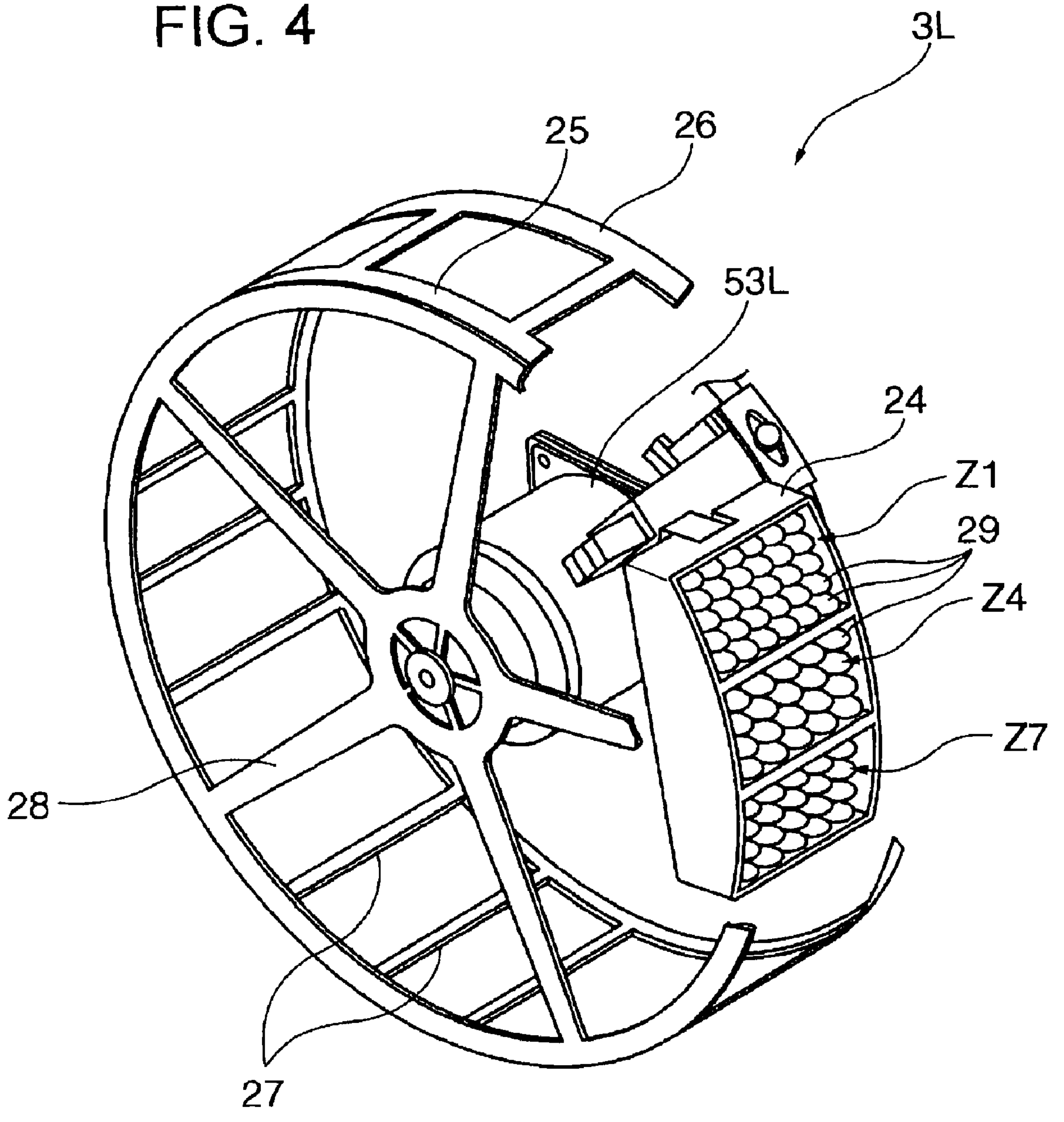
FIG. 4 is a view showing a configuration of the rotating reel as shown in FIG. 3.

FIG. 1 is a perspective view showing a configuration example of the slot machine, FIG. 2 is a view showing an enlarged game area of the slot machine, FIG. 3 is a view showing a rotating reel display device showing an example of a variable display device, and FIG. 4 is a view showing a configuration of the rotating reel as shown in FIG. 3.

The slot machine 1 according to this embodiment is provided with a housing 3 having an openable/closable front door 2 at the front. In the front door 2, a liquid crystal display portion (a liquid crystal display device) 2*a* constituting a transmissive image display device is provided in the portion higher than almost the center at the front. In the inside of the housing 3, a rotating reel display device 3 having three rotating reels 3L, 3C, and 3R constituting the variable display device is provided inside the front door 2 (on the back of the liquid crystal display portion 2*a*). On the circumferential surface of each of the rotating reels, a plurality of kinds of identification information, for example, a symbol line is drawn, and symbols drawn on the rotating reels can respectively be visually recognized through rectangular symbol display areas 21L, 21C and 21R (see FIG. 2) formed in the liquid crystal display portion 2*a*.

A pay line L1 extending horizontally is provided in the symbol display areas 21L, 21C and 21R in relation to the rotating reels 3L, 3C and 3R. In addition, not shown in the symbol, as well as the pay line, other pay lines may be provided in the upper and lower portions, and two pay lines may further be provided obliquely. When a plurality of pay lines is provided, the number of pay lines may be varied corresponding to the amount of game value inserted for the game.

The liquid crystal display portion 2*a* is provided with the symbol display areas 21L, 21C and 21R, window frame display areas 22L, 22C and 22R respectively provided to enclose the areas 21L, 21C and 21R, and representation display area 23. The window frame display areas 22L, 22C and 22R represent frames of display windows of symbols drawn on the rotating reels 3L, 3C and 3R, respectively. Further, the representation display area 23 displays dynamic images such as a representation image to determinably broadcast that establishment of wining a bonus can be achieved, representation image to increase interest in the game, information necessary for the player to develop the game with advantage, representation images for demonstration, and the like.

As a matter of course, the liquid crystal display portion 2*a* may display static images as well as dynamic images. Such static images may be displayed by image control in the liquid crystal display portion, or a configuration may be adopted that a panel on which the static image is drawn is attached.

A base portion 4 with a substantially horizontal surface is formed under the liquid crystal display portion 2*a*. On the left side of the base portion 4 are provided BET switches 5 and 6 to bet a game value (for example, credited medal). Further, on the right side of the base portion 4 is provided a medal inserting slot 7 to insert a medal that is the game value, and to the right of the opening 7 is provided a bill inserting slot 8 to insert a bill that is the game value.

In the center portion of the base portion 4 is provided a start button (game start instructing means operable by a player) 10 to rotate the above-mentioned rotating reels by pressing operation of the player and start variations of symbols (start the game) in the symbol display areas 21L, 21C and 21R.

Further, in the lower position of the front door 2, a medal payout outlet 13 and medal receiving portion 14 are installed, while to both sides of the medal payout outlet 13 are provided speakers 15L and 15R for generating sound effects of the representation and the like. Further, in the upper position of the front door 2 is provided a dividend table panel 16 for displaying combinations of wining symbols, the number of dividend medals and the like.

The above-mentioned liquid crystal display portion 2*a* is comprised of a transmissive liquid crystal display device 30 provided with protection glass, display plate, liquid crystal panel, light guide plate, reflection film, light source, flexible board that is comprised of a table carrier package (TCP) installed with ICs for driving the liquid crystal panel and that is connected to a terminal portion of the liquid crystal panel, and the like. The detailed configuration of the transmissive liquid crystal display device 30 will be described later.

A display mode of the liquid crystal panel is set at normally white, and enables symbols arranged on the rotating reels 3L, 3C and 3R to be visually recognized through the symbol display areas 21L, 21C and 21R to be able to continue the game even when such a situation occurs that the liquid crystal cannot be driven. Then, the symbols of the rotating reels 3L, 3C and 3R can be visually recognized when the liquid crystal existing in the symbol display areas 21L, 21C and 21R is not driven, while when the liquid crystal existing in the symbol display areas 21L, 21C and 21R is driven, display of representation or the like in this portion can be visually recognized.

As shown in FIGS. 3 and 4, LED lamps 29 are installed inside three rotating reels, 3L, 3C and 3R, of the rotating reel display device 3. The LED lamps 29 have a function as lighting means of areas mainly corresponding to the symbol display areas 21L, 21C and 21R among areas of lighting means of the symbols drawn on the rotating reels 3L, 3C and 3R and the liquid crystal panel.

In the inside of the rotating reels 3L, 3C and 3R, LED storage circuit boards 24 are installed on the back of symbols (total nine symbols; see FIG. 2) in three vertical lines appearing in the symbol display areas 21L, 21C and 21R when rotation of the rotating reels 3L, 3C and 3R is stopped, respectively. Each of the LED storage circuit boards 24 has three LED storage portions installed with a plurality of LED lamps 29. In the figure, total nine LED storage portions are indicated by Z1, Z2, Z3 starting from the left in the upper stage, Z4, Z5, Z6 starting from the left in the center stage, and Z7, Z8, Z9 starting from the left in the lower stage. The LED lamps 29 provided in the storage portions illuminate with white light the rear sides of the reel sheets with the symbols drawn thereon attached along the circumferential surfaces of the rotating reels 3L, 3C and 3R. The reel sheets have translucency, and the light output from the LED lamps 29 is transmitted to the front side.

As shown in FIG. 4, each of the rotating reels (the rotating reel 3L on the left side is only shown) is comprised of a cylindrical frame structure formed by coupling two circular frames 25 and 26 of the same shape spaced a predetermined distance (reel width) with a plurality of coupling members 27, and a conveying member 28 for conveying the driving force of a stepping motor 53L provided in the center portion of the frame structure to the circular frames 25 and 26.

Further, the LED storage circuit board 24 disposed on the inner side of each rotating reel is provided with three LED storage portions, Z1, Z4 and Z7, each storing a plurality of LED lamps 29. The LED storage circuit board 24 is installed so that the LED storage portions Z1, Z4 and Z7 are positioned on the back sides of respective symbols (total three symbols) that the player can visually recognize through the symbol display area 21L. In addition, the rotating reels 3C and 3R are not shown in the figure, but have the same configuration as that of the rotating reel 3L, and the LED storage circuit board 24 is provided inside each of the reels.

Figure 5:
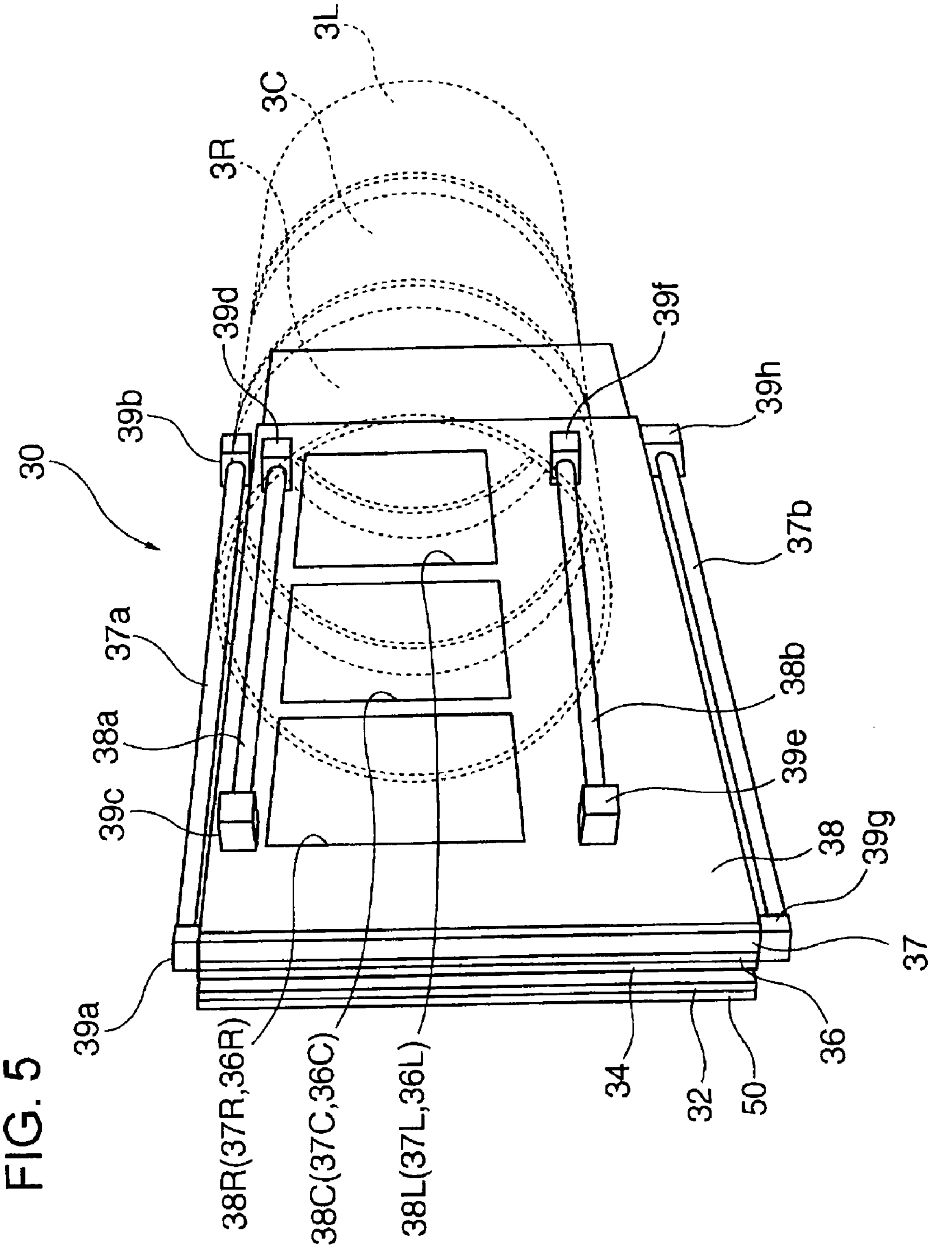
FIG. 5 is a schematic perspective view of a liquid crystal display device viewed from the inner side of the housing.
Figure 6:
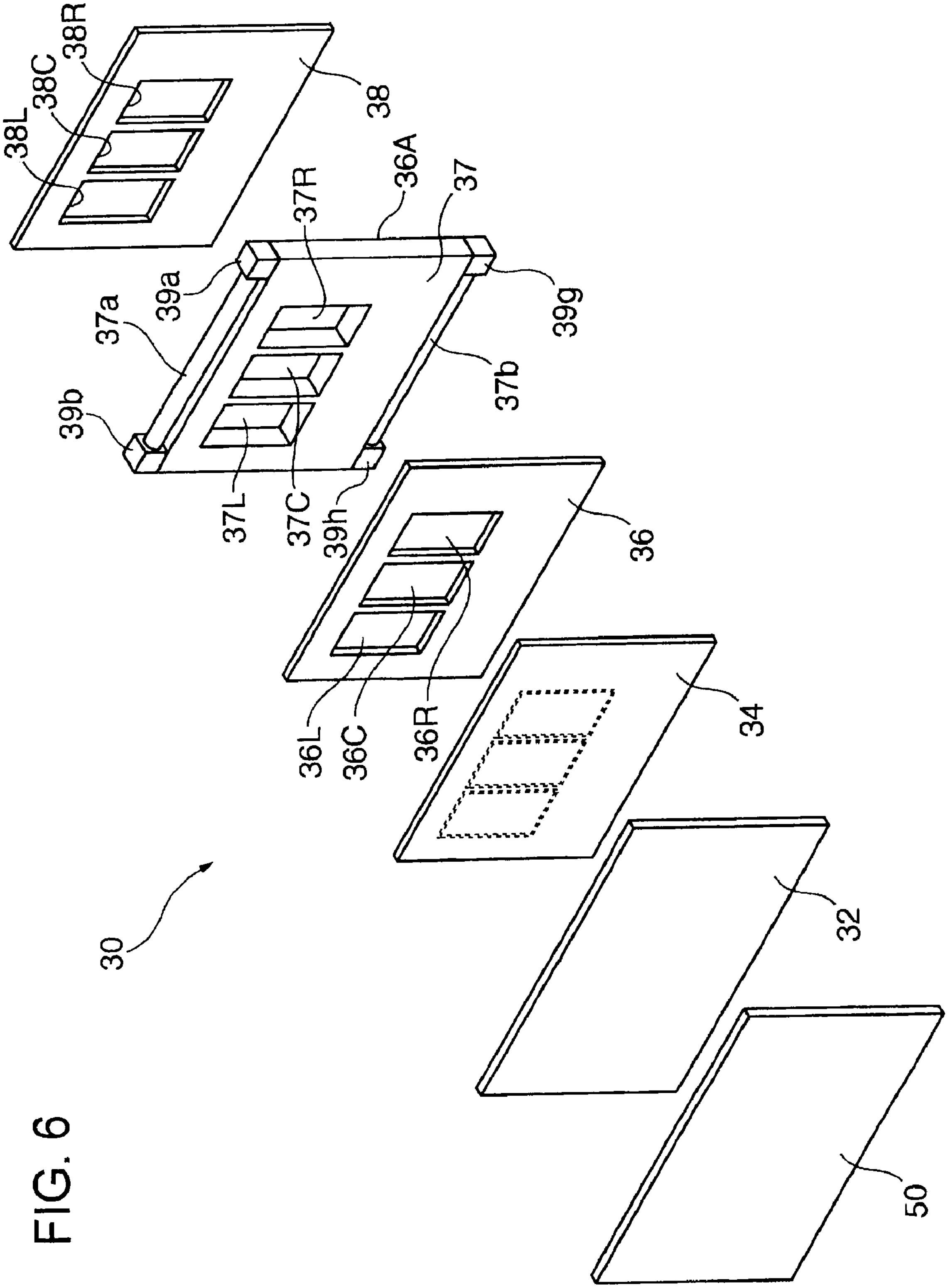
FIG. 6 is a development view of a configuration of part of the liquid crystal display device.

A configuration of the transmissive liquid crystal display device 30 constituting the liquid crystal display portion 2*a* will be described below with reference to FIGS. 5 and 6. In addition, FIG. 5 is a schematic perspective view of the liquid crystal display device 30 viewed from the inner side of the housing, and FIG. 6 is a development view of the configuration of part of the liquid crystal display device 30.

The liquid crystal display device 30 is installed forward of the display areas of the rotating reels 3L, 3C and 3R spaced a predetermined distance, and provided with a polarizing film 32, liquid crystal panel 34, diffusing sheet 36, light guide plate 37, reflector 38, fluorescent lamps (individual lighting means) 37*a*, 37*b*, 38*a* and 38*b* that are so-called white light sources (including light of all wavelengths with rates such that specific colors are not distinguished by human eye), lamp holders 39*a* to 39*h*, flexible board (not shown) that is comprised of a table carrier package (TCP) installed with ICs for driving the liquid crystal panel and that is connected to the terminal portion of the liquid crystal panel 34, and the like.

The liquid crystal panel 34 is formed by sealing liquid crystal in between the transparent board such as a glass board or the like on which a thin-film transistor is formed and another transparent board opposite to each other. In the panel 34, to the front side is attached the polarizing film 32 to generate light (linear polarization) in the vibration direction of liquid crystal molecules of the liquid crystal panel, and to the back side is attached the diffusing sheet 36 to diffuse the light from the light guide plate 37 to apply the light uniformly to the liquid crystal panel 34. The display mode of the liquid crystal panel 34 is set at normally white. Herein, the normally white is a configuration to make white display (the light goes to the display surface side, i.e. the transmitted light is visually recognized from the outside) when the liquid crystal is not driven. By adopting the liquid crystal panel 34 configured to be normally white, even when the situation occurs that the liquid crystal cannot be driven, it is possible to visually recognize symbols drawn on the rotating reels 3L, 3C and 3R through the symbol display areas 21L, 21C and 21R, and to continue the game. In other words, even when such a situation occurs, it is made possible to play the game based on the variable display manner and stop display manner of the rotating reels 3L, 3C and 3R.

The light guide plate 37 is provided on the back of the liquid crystal panel 34 to guide the light from the fluorescent lamps 37*a* and 37*b* to the liquid crystal panel 34 (to light the liquid crystal panel), and for example, is formed of a translucent member (having the light guide function) such as an acrylic resin and the like with the thickness of about 2 cm.

Used as the reflector 38 is, for example, a plate such that a silver deposition film is formed on a white polyester film or aluminum thin film, and the reflector 38 reflects the light introduced to the light guide plate 37 toward the front side of the light guide plate 37.

In the diffusing sheet 36, light guide plate 37 and reflector 38, transmissive areas (36L, 36C and 36R), (37L, 37C and 37R) and (38L, 38C and 38R) are formed in relation to installation positions of the rotating reels 3L and 3C and 3R, respectively. The size and position of each of the transmissive areas is formed to agree with the symbol display area 21L, 21C or 21R as shown in FIG. 2, and the light introduced to the light guide plate 37 is reflected in areas except the transmissive areas to function as the lighting means of the window frame display areas 22L, 22C and 22R of the liquid crystal panel 34 and representation display area 23. According to this configuration, the player is capable of visually recognizing the variable display and stop display of each of the rotating reels through the transmissive area, and therefore, enjoying the game according to the display manner of the rotating reels in the symbol display areas 21L, 21C and 21R and the display manner of the liquid crystal display portion 2*a*.

The fluorescent lamps 37*a* and 37*b* are disposed along the upper end portion and lower end portion of the light guide plate 37, and opposite ends of the lamps are supported by lamp holders 39*a* and 39*b* and lamp holders 39*g* and 39*h*. The fluorescent lamps 37*a* and 37*b* introduce the light to the light guide plate 37, and function as the lighting means of areas mainly corresponding to the window frame display areas 22L, 22C and 22R and the representation display area 23 among areas of the liquid crystal panel 34.

The fluorescent lamps 38*a* and 38*b* are disposed toward the rotating reels 3L, 3C and 3R in the upper position and lower position on the back side of the reflector 38. The light from the fluorescent lamps 38*a* and 38*b* irradiates the surface areas (three symbol areas in the vertical direction) of the rotating reels 3L, 3C and 3R, while the reflected light from the areas lights the liquid crystal panel 34. Accordingly, in addition to the lighting means of symbols arranged on the rotating reels 3L, 3C and 3R, the fluorescent lamps 38*a* and 38*b* have the function as the lighting means of areas mainly corresponding to the symbol display areas 21L, 21C and 21R among the areas of the liquid crystal panel 34.

The surface of the polarizing film 32 that is the surface portion of the above-mentioned liquid crystal display device 30 is subjected to non-glare treatment. The non-glare treatment (also referred to as anti-glare treatment) is treatment for forming, for example, minute asperities on the surface of the polarizing film 32, and the like to roughen the surface. Such minute asperities are made to diffuse reflection of mirror-surface shape, and are treatment (reflection reducing treatment) for providing minute asperities on the smooth surface to roughen, scattering the light input from the player side, and reducing the reflectance. Such non-glare treatment can be formed by a sandblast scheme for blasting a fine-particle solid onto the surface of the polarizing film 32, an embossing scheme for transferring the concavo-convex pattern to the polarizing film 32 using a die processed in the concavo-convex shape, a method for adding fine particles of silica or the like to a UV curable resin composition to coat the film, and applying ultraviolet rays to form a cured film with asperities, and the like. In other words, by roughening the surface, the light input from the environment is reflected diffusely, the reflectance is decreased, glare from the environment can be reduced, and it has become common that such non-glare treatment is performed in recent image display devices.

Figure 7:
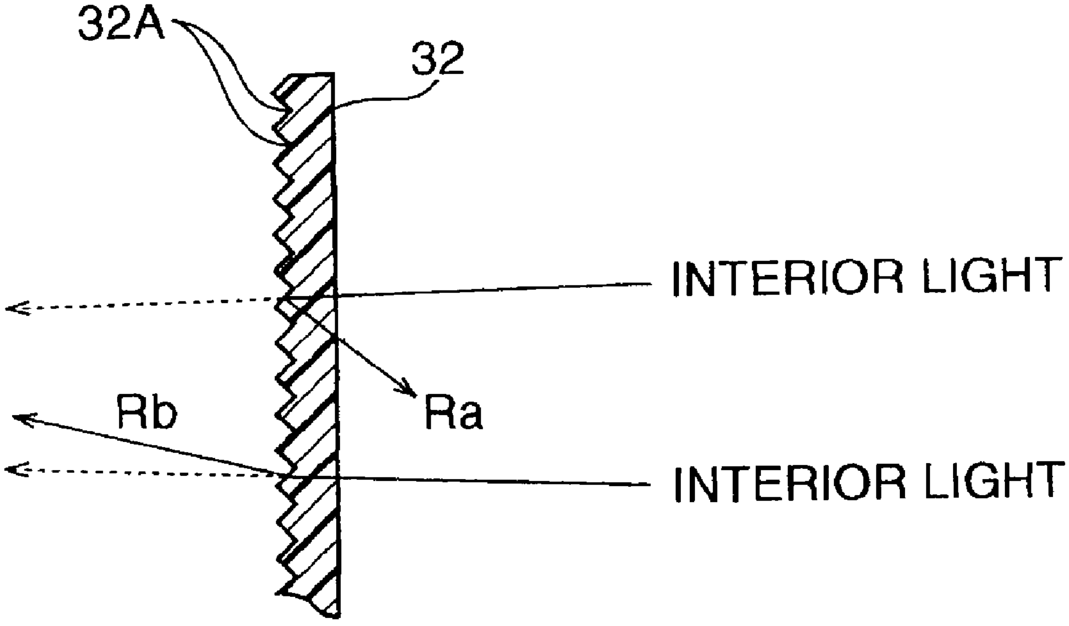
FIG. 7 is a schematic view illustrating non-glare treatment subjected to a surface portion of a polarizing film.

However, as schematically shown in FIG. 7, the above-mentioned non-glare treatment causes the light from the inner side (reflected light from the rotating reels) to scatter in the concavo-convex areas of the surface, and the player feels the symbol information of the rotating reels dark. This is considered mainly due to diffuse reflection (Ra) of the light from the inside by the asperities 32A on the interface portion, or deflection (Rb) caused by the difference in refractive index between the polarizing film 32 and air in the interface portion. In other words, since the concavo-convex-shaped non-glare treatment is made, for the reason of the light from the inside being reflected and/or deflected, the transmittance decreases as a whole, and as a result, the player feels the symbol information of the rotating reels dark.

Figure 8:
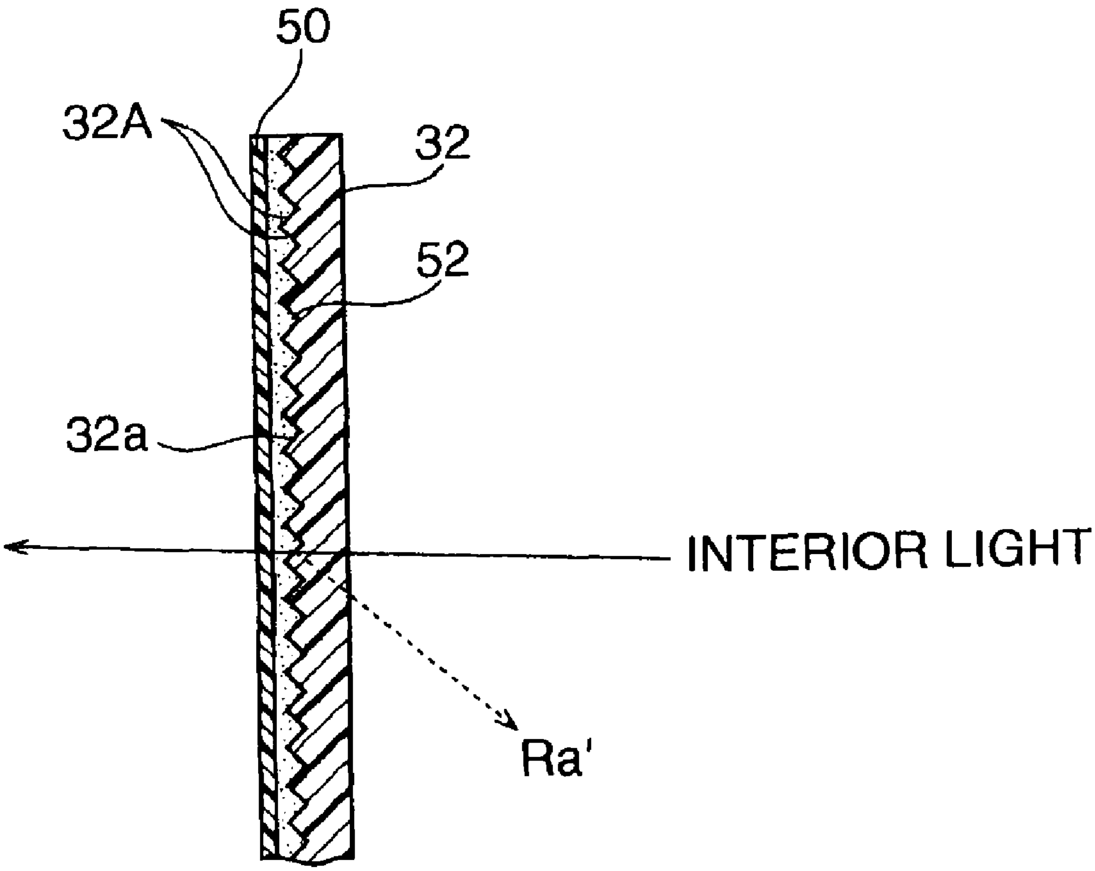
FIG. 8 is a view showing a state where a PET sheet is attached to the surface portion of the polarizing film subjected to non-glare treatment.

Therefore, as shown in FIGS. 6 and 8, the covering member 50 to enhance the transmittance of the light from the inside is attached to the surface portion of the polarizing film 32 subjected to the non-glare treatment. In other words, by attaching such a covering member 50, even in the image display device subjected to the non-glare treatment, it is made possible to change to glare treatment with ease. By this means, diffuse reflection and deflection of the light in the portion subjected to the non-glare treatment is suppressed to improve the transmittance of the light, and it is aimed not to make the player feel the symbol information dark.

More specifically, the covering member 50 is formed of a PET film that is a transparent material, and attached to the surface portion 32*a* of the polarizing film 32 through the adhesive liquid 52 with translucence. In other words, the adhesive liquid 52 is applied to the surface portion 32*a* subjected to the non-glare treatment using a brush or the like, and then, the PET film (hereinafter, also referred to as the PET film 50) that is the covering member is attached. By this means, although the adhesive liquid 52 exists between the PET film 50 and surface portion 32*a*, since the PET film 50 is attached, the adhesive liquid 52 is filled evenly in the asperities 32A subjected to the non-glare treatment. Therefore, it is made possible to suppress the diffusion reflection of the light in the interface portion between the adhesive liquid 52 and surface portion 32*a* (Ra'), and to enhance the translucency of the light from the inside.

In this case, for the adhesive liquid 52 being used, it is preferable to use a transparent material (for example, a UV curable resin) with the same refractive index as the refractive index of the material forming the polarizing film 32. In other words, by using the material with the same refractive index as that of the polarizing film 32 with the asperities 32A formed thereon, the deflection of the light due to the difference in refractive index is suppressed in the interface portion between the adhesive liquid 52 and surface portion 32*a*, the translucency is enhanced, and it is possible to ease visual recognition. Further, for the adhesive liquid 52, the adhesive liquid may be attached to the PET film 50 side in advance, or such a configuration may be adopted that the PET film 50 is attached to the surface portion of the polarizing film after applying the adhesive liquid to the PET film 50.

Further, the interface portion between the covering member 50 and adhesive liquid 52 is a flat state (without asperities), and the light is not diffusely reflected. Therefore, for the covering member 50 being used, by using a thinned material with high translucency, the absorption of light is suppressed, and it is possible to improve the visual recognition characteristic.

Figure 9A:
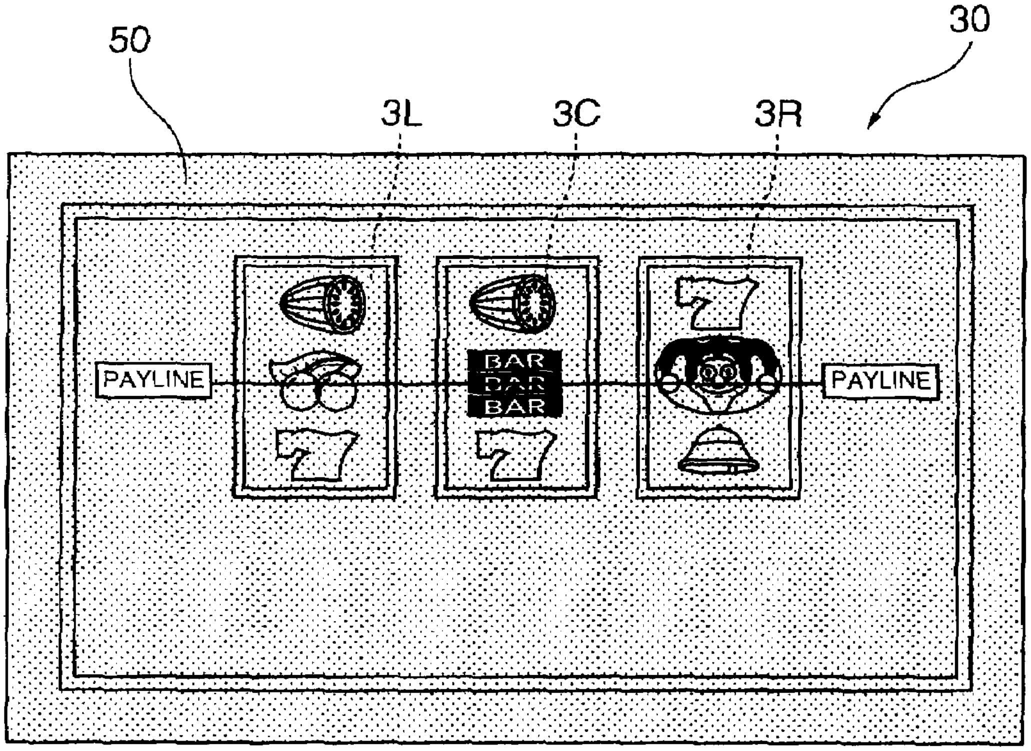
FIGS. 9(*a*) and 9(*b*) are front views each showing an example of an attachment area of a covering member attached to the surface portion of the image display device.
Figure 9B:
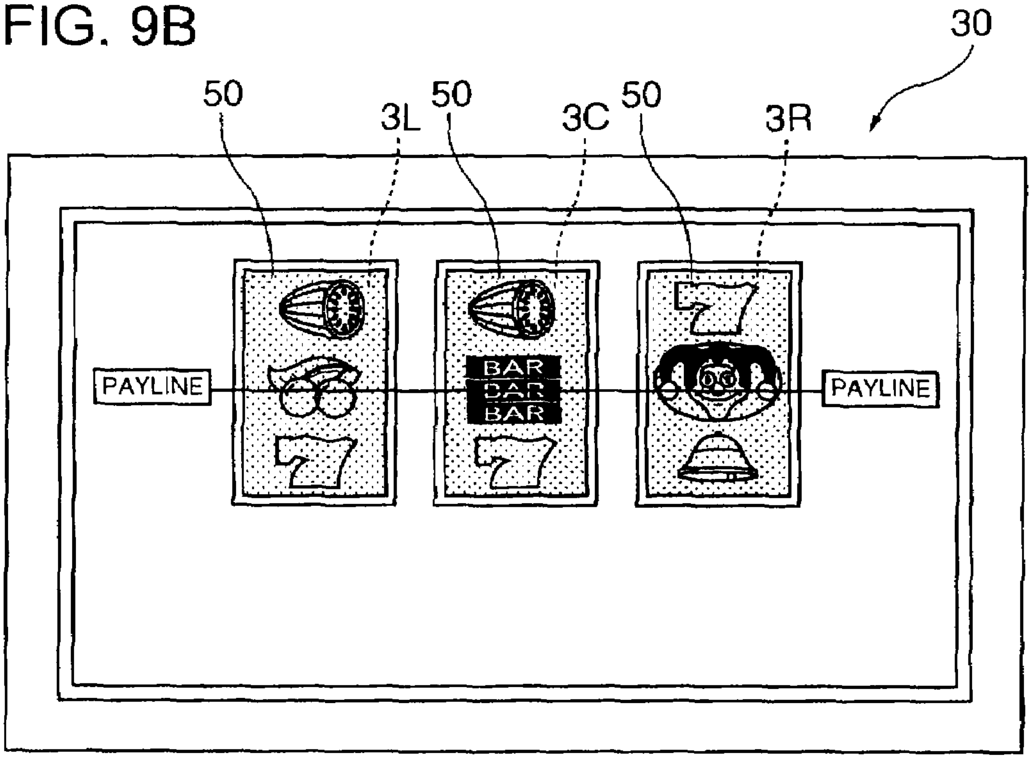

As shown in FIG. 9(*a*), the covering member 50 as described above may be attached to cover the entire area (all of the liquid display portion 2*a*) within the surface portion of the liquid crystal display device 30. Alternately, in order to effectively enhance the visual recognition characteristic during the game, as shown in FIG. 9(*b*), the covering member 50 may be attached to part of the area, for example, only the areas corresponding to the symbol display areas 21L, 21C and 21R enabling visual recognition of the symbol information of the rotating reels 3L, 3C and 3R. In such a configuration, during the game, the transmittance is improved in the portions of the rotating reels that are portions at which the player gazes, thereby improving the visual recognition characteristic, while glare from the environment is prevented in areas except such portions due to the beforehand formed non-glare treatment, and the game becomes easier to play. In particular, since the player gases at the symbol information of the rotating reels 3L, 3C and 3R while viewing from the front, it is made easier for the player to visually recognize both the information, and fatigue of eyes is reduced.

The embodiment of the invention is described in the foregoing, but the invention is not limited to the aforementioned embodiment, and is capable of being modified in various manners.

In the above-mentioned embodiment, the portion subjected to non-glare treatment is the polarizing film 32 among the liquid crystal display device. However, such a portion subjected to non-glare treatment varies in various manners with the configuration of the liquid crystal display device. For example, in a configuration installed with protection glass on the surface portion or installed with a touch panel, it is considered that the surface portion is subjected to non-glare treatment. In this case, the above-mentioned covering member 50 is attached to such a portion subjected to non-glare treatment.

Further, in the above-mentioned embodiment, the variable display device is configured as a rotating reel device that mechanically rotates, but is not limited to such a device that mechanically operates to be visually recognized. For example, the variable display device may be configured using a device such as, for example, CRT, LCD, plasma display, organic EL display, liquid crystal projector and the like which displays images associated with the game.

Furthermore, the invention is applicable to various kinds of gaming machines such as a pachinko gaming machine, arrange ball, mah-jongg gaming machine, video slot, video poker and the like, as well as the above-mentioned slot machine.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A gaming machine comprising:

a variable display device configured to variably display a plurality of symbol-bearing reels associated with an outcome of a wagering game;

a transmissive display device adjacent the variable display device and configured to transition between a transmissive state, wherein at least a portion of the symbol-bearing reels is visible through the transmissive display device, and a non-transmissive state, wherein the portion of the symbol-bearing reels is visibly obstructed by the transmissive display device;

a polarizing layer adjacent the transmissive display device, the polarizing layer being configured to diffuse light; and a covering layer adjacent the polarizing layer and configured to enhance transmittance of light from the transmissive display device through the polarizing layer, the covering layer including a film attached to a surface of the polarizing layer via an adhesive liquid, the adhesive liquid including a material with a refractive index substantially the same as a refractive index of the polarizing layer.

2. The gaming machine according to claim 1, wherein the film is transparent and the adhesive liquid is translucent.

3. The gaming machine according to claim 1, wherein the covering layer is attached to an area of the transmissive display device to thereby increase visual recognition of the portion of the symbol-bearing reels of the variable display device through the polarizing layer and the transmissive display device when in the transmissive state.

4. The gaming machine according to claim 1, wherein the adhesive liquid is located between the film and the surface of the polarizing layer, and is filled substantially uniformly in concavo-convex portions on the surface of the film.

5. The gaming machine according to claim 1, wherein the adhesive liquid is attached to the film on a side thereof intermediate the film and polarizing layer.

6. The gaming machine according to claim 1, wherein after coating the film with the adhesive liquid, the film is attached to the surface of the polarizing layer.

7. The gaming machine according to claim 1, wherein the transmissive display device includes a transmissive liquid crystal display panel.

8. The gaming machine according to claim 1, wherein the polarizing layer includes a polarizing film with a surface subjected to non-glare treatment.

9. The gaming machine according to claim 8, wherein the covering layer is attached to the surface of the polarizing film subjected to the non-glare treatment.

10. The gaming machine according to claim 9, wherein the film is a transparent PET film and the adhesive liquid is translucent.

11. The gaming machine according to claim 1, wherein the covering layer is attached only to a portion or portions of the transmissive display device through which the portion of the symbol-bearing reels is visible when the transmissive display device is in the transmissive state.

12. A gaming terminal for displaying an outcome of a wagering game, the outcome being randomly determined from a plurality of wagering game outcomes, the gaming terminal comprising:

a variable display device configured to display a plurality of reels each having a plurality of symbols associated with the outcome of the wagering game;

a transmissive display device in front of the variable display device, at least some portions of the transmissive display device being selectively operable to transition between a transmissive condition, whereat a portion of the symbol-bearing reels is visible through the transmissive display device, and a non-transmissive condition, whereat the portion of the symbol-bearing reels is visibly obstructed by the transmissive display device;

a polarizing layer attached to the transmissive display device on a side thereof opposite the variable display device, the polarizing layer being configured to diffuse light; and a cover layer attached to the polarizing layer, the cover layer being configured to suppress the diffusion of light in the polarizing layer, the cover layer including a film attached to the polarizing layer via a liquid adhesive, the liquid adhesive including a material with a refractive index substantially the same as a refractive index of the polarizing layer.

13. The gaming terminal of claim 12, wherein the polarizing layer includes a surface with a non-glare treatment, and wherein the film is attached to the surface of the polarizing layer with the non-glare treatment.

14. The gaming terminal of claim 12, wherein the liquid adhesive is translucent and the film is transparent.

15. The gaming terminal of claim 12, wherein the film is a transparent polymeric film.

16. The gaming terminal of claim 12, wherein a surface of the film to which the liquid adhesive is applied is substantially flat.

17. The gaming terminal of claim 13, wherein the non-glare treatment includes asperities on the surface of the polarizing layer, and wherein the liquid adhesive is applied substantially evenly over the asperities on the surface of the polarizing layer.

18. The gaming terminal of claim 12, wherein the film and the liquid adhesive collaboratively offset diffuse reflection and diffuse refraction of light in the polarizing layer.

19. The gaming terminal of claim 12, wherein the cover layer is attached to only selected areas of the polarizing layer corresponding to the at least some portions of the transmissive display device that are selectively operable to transition between the transmissive and non-transmissive conditions.

20. A display assembly for a wagering game terminal, the display assembly comprising:

a variable display device configured to variably display and stop display a plurality of symbol-bearing reels, each of the reels having a plurality of symbols associated with an outcome of a wagering game, the outcome being randomly selected from a plurality of wagering game outcomes;

a transmissive display device configured to mount in front of the variable display device, one or more selected portions of the transmissive display device being operable to transition between a transmissive condition, whereat a portion of the symbol-bearing reels is visible through the transmissive display device, and a non-transmissive condition, whereat the portion of the symbol-bearing reels is visibly obscured by the transmissive display device;

a polarizing layer attached to a surface of the transmissive display device on a side thereof opposite the variable display device, the polarizing layer being configured to diffuse light; and a cover layer attached to a surface of the polarizing layer, the cover layer being configured to suppress the diffusion of light of the polarizing layer, the cover layer including a film attached to the surface of the polarizing layer via a liquid adhesive, the liquid adhesive including a material with a refractive index substantially the same as a refractive index of the polarizing layer.

21. The display assembly of claim 20, wherein the film is transparent and the liquid adhesive is translucent.

22. The display assembly of claim 20, wherein a surface of the film to which the liquid adhesive is applied is substantially flat.

23. The display assembly of claim 20, wherein the surface of the polarizing layer to which the cover layer is attached includes a non-glare treatment comprising asperities, and wherein the liquid adhesive is applied substantially evenly over the asperities on the surface of the polarizing layer.

24. The display assembly of claim 20, wherein the cover layer is attached to only selected areas of the polarizing layer corresponding to the selected portions of the transmissive display device that are operable to transition between the transmissive and non-transmissive conditions.

25. A gaming system for playing a wagering game, the gaming system comprising:

an input device configured to receive an input from a player;

a controller configured to determine outcomes of the wagering game, each of the outcomes being randomly determined from a plurality of wagering game outcomes;

a variable display device configured to display a plurality of symbols associated with the outcomes of the wagering game; and a front display device disposed adjacent the variable display device, the front display device including:

a transmissive liquid crystal panel through which the plurality of symbols displayed by the variable display device can be seen;

a light guiding plate disposed between the liquid crystal panel and the variable display device, the light guiding plate being configured to transmit at least a portion of light emitted from a light source to the liquid crystal panel;

a polarizing layer on a surface of the transmissive liquid crystal panel, the polarizing layer including a surface treatment configured to diffuse light and thereby reduce glare; and a diffusion-suppressing layer on a surface of the polarizing layer, the diffusion-suppressing layer being configured suppress at least a portion of the diffused light of the polarizing layer and thereby enhance translucency, the diffusion-suppressing layer including a film attached to the surface of the polarizing layer via a liquid adhesive, the liquid adhesive including a material with a refractive index substantially the same as a refractive index of the polarizing layer.

* * * * *